Feb. 12, 1935. O. R. MITCHELL 1,991,330
CLASP BRAKE
Filed Feb. 13, 1932 4 Sheets-Sheet 1

Patented Feb. 12, 1935

1,991,330

UNITED STATES PATENT OFFICE 1,991,330

CLASP BRAKE

Ormah R. Mitchell, Chicago, Ill., assignor to American Steel Foundries, Chicago, Ill., a corporation of New Jersey Application February 13, 1932, Serial No. 592,700

63 Claims. (Cl. 188—46)

The invention relates to brake mechanism and more particularly to truck brakes for railway cars.

An object of the invention is to provide an improved brake arrangement in which two cylinders per truck are connected to clasp brakes in a manner to meet all the service requirements for successful operation.

A yet further object is to provide a brake arrangement in which the cylinders will be secured directly to the truck frame omitting the use of all intermediate brackets, and wherein the cylinders will be so positioned on the frame that clearance conditions, especially on curves, will be greatly improved.

A yet further object of the invention is to provide an improved brake arrangement wherein the lever ratio of the pressure operated levers will be considerably reduced, which will result in a substantial decrease in the working pressures at a plurality of points.

Another object is to provide a compact brake mechanism in which all the parts will be readily accessible and which will be efficient in operation and of extreme simplicity in construction.

With these and various other objects in view, the invention may consist of certain novel features of construction and operation, as will be more fully described and particularly pointed out in the specification, drawings and claims appended hereto.

In the drawings, which illustrate an embodiment of the device and wherein like reference characters are used to designate like parts—

This application is a continuation in part of application Serial No. 433,545 filed March 6, 1930.

The brake mechanism contemplated in the present application is shown as applied to a particular six-wheel truck, though it is to be understood, of course, that the brake mechanism as well as the operating mechanism therefor could be applied to any type of truck; and, although mechanism for substantially one side of a truck is illustrated, it is understood that the other part of the mechanism is a duplicate of that shown.

The truck frame 10 is provided with the side frame members 12 connected by the end beams 14 and the spaced intermediate beams 16, the side frames being provided with the depending pedestals 18 having cooperative relation with the spaced wheel and axle assemblies 20 through any form of journal box or other journal means (not shown). Brake shoes 22 are disposed on each side of the spaced wheels and are pivotally mounted on trunnions of the spaced brake beams 24, said beams being pivotally mounted on the truck by means of the brake beam hanger links 26 pivoted as at 28 to the brake beam trunnions and pivoted to the car truck as at 30, suitable brackets 32 being provided therefor. The brake shoe adjacent the dead truck lever and the associated brake beam is pivoted to the truck frame by the hanger link 33 pivoted to the bracket 35 provided on the side frame.

Figure 1:
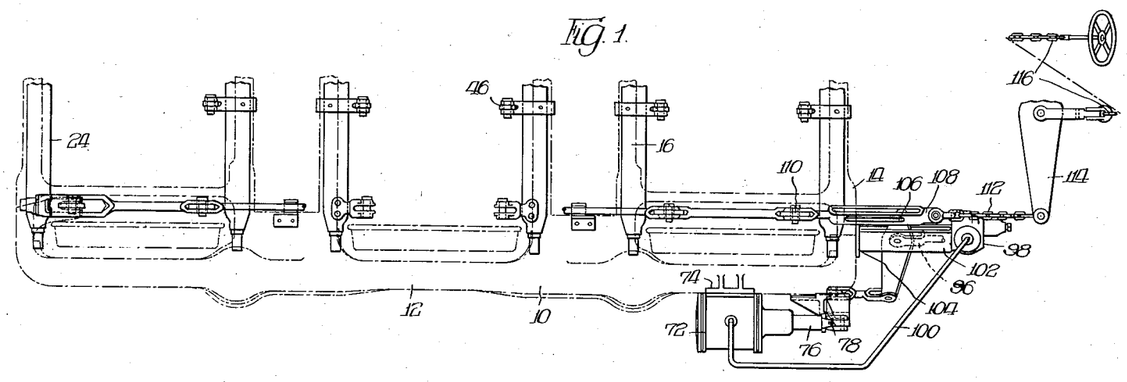
Figure 1 is a fragmentary top plan view of a truck construction provided with brake mechanism embodying the invention.
Figure 2:
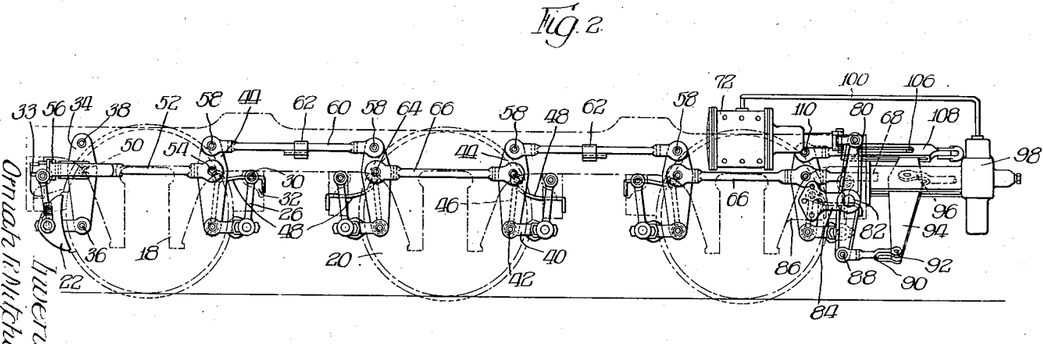
Figure 2 is a side elevation of the truck construction shown in Figure 1.
Figure 3:
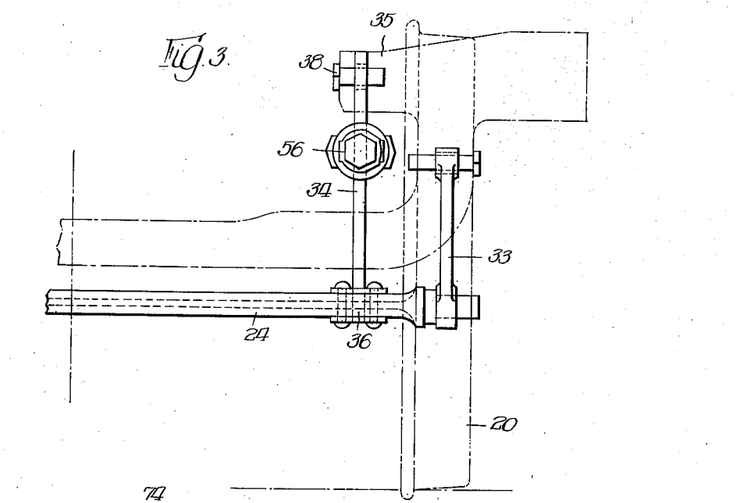
Figure 3 is an enlarged fragmentary end elevation of the truck construction as viewed from the left in Figure 1.
Figure 4:
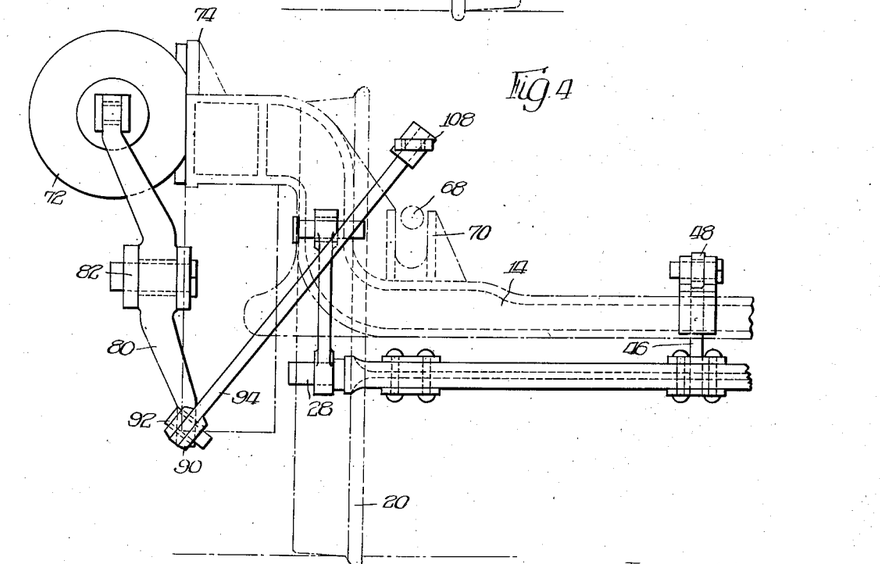
Figure 4 is an enlarged fragmentary end elevation as viewed from the right in Figure 1.
Figure 5:
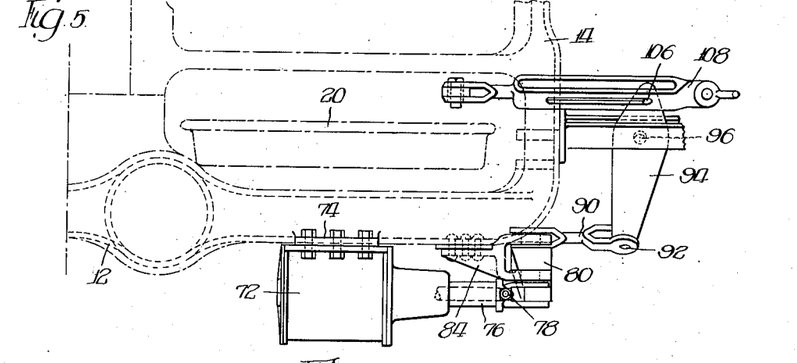
Figure 5 is an enlarged fragmentary top plan view of the end of the truck provided with the unit cylinder mechanism.
Figure 6:
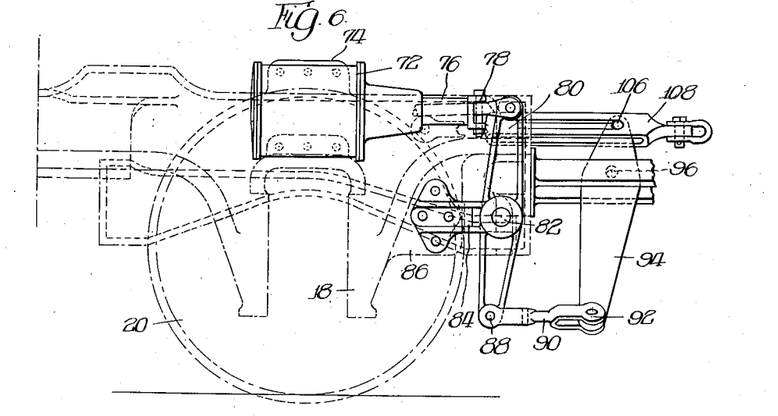
Figure 6 is an enlarged fragmentary side elevation of the truck construction shown in Figure 5.

The end brake beam, as viewed at the left in Figures 1 and 2 is pivotally linked to the lower end of the dead truck or dead brake lever 34 as at 36, said truck lever being pivoted at its upper end as at 38 to the truck frame. The other brake beams are provided with the links 40 which are pivotally mounted as at 42 to the lower ends of live truck levers 44, and the brake beams are pivoted to the brake beam hanger links 46 pivotally mounted on the bracket 48 provided on the spaced beams 14 and 16 of the truck. A dead truck lever 34 is pivotally connected intermediate the ends thereof as at 50 to the pull rod 52, disposed above the axle, the opposite end of the pull rod 52 being pivotally mounted as at 54 to the adjacent live lever 44 intermediate the ends thereof, the end of the pull rod 52 being provided with the slack adjusting means 56.

Adjacent live levers of adjacent wheel and axle assemblies are pivoted as at 58 to the pull rods 60 slidably mounted on the brackets 62 provided on the truck frame between the wheels. The live levers are pivotally mounted as at 64 to the pull rods 66 disposed above the axles and pivoted to said live truck levers intermediate the ends thereof. The pull rod 66 provided at the right end of the truck is provided with an extension 68 extending between the jaws of the brackets 70 provided on the end connecting member 14 whereby safety and guide means is provided and antifriction means (not shown) may be provided for supporting cooperation.

The operating cylinder 72 is mounted on the bracket 74 provided on the truck frame, said cylinder having the piston rod 76 mounted therein, the end of said piston rod being coupled as at 78 to the upper end of the operating or diagonally disposed cylinder lever 80, the operating lever 80 being pivoted as at 82 to the bracket 84 mounted on the truck frame by means of the bracket 86 provided adjacent the pedestal. The lower end of the operating rod 80 is pivoted as at 88 to the pull rod 90, said pull rod being pivotally connected as at 92 to the lower end of the fulcrum lever 94.

Figure 7:
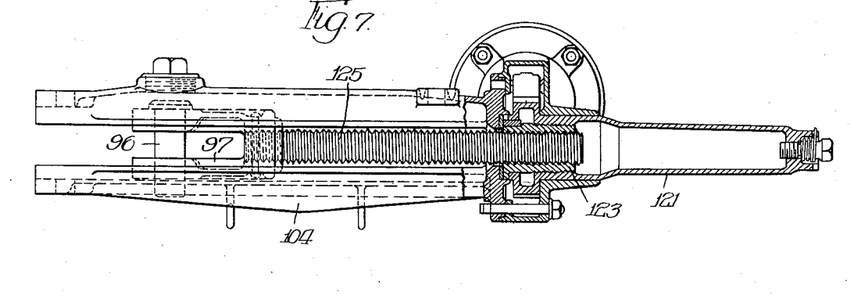
Figure 7 is an enlarged sectional top plan view of the slack adjuster.
Figure 8:
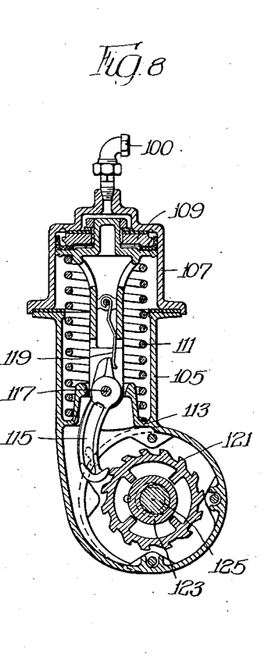
Figure 8 is an enlarged sectional elevation through the slack adjuster cylinder.
Figure 9:
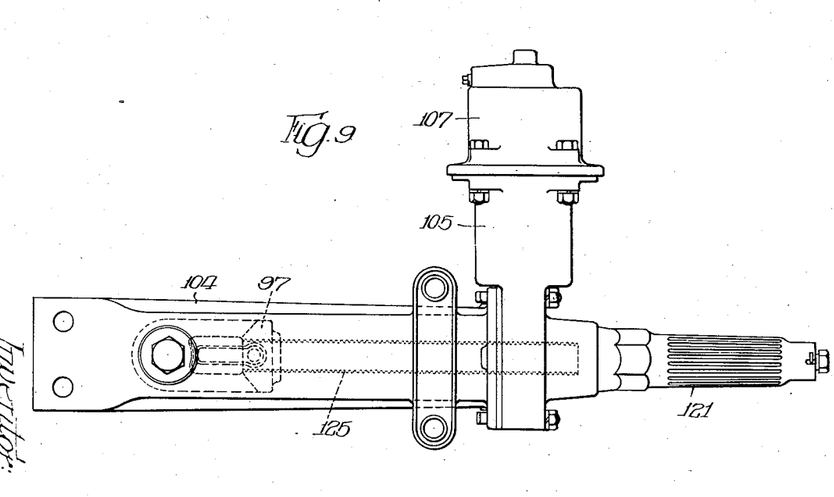
Figure 9 is a side elevation of the slack adjuster.

The fulcrum lever 94 is pivoted intermediate the ends thereof as at 96 to means such as the crosshead 97 of the slack adjuster by pivotal connection between the arms or members 102 of the bracket or adjuster body 104 provided on the truck frame. The slack adjuster consists essentially of the body 104 provided with the casing 105, said casing having a cylinder 107 secured thereto and being connected to the brake cylinder by means of the air line 100. The piston 109 is slidably mounted in the cylinder and is normally urged upwardly by means of the piston spring 111 disposed between a shouldered portion 113 of the casing and the piston. The piston is provided with a pawl 115 normally urged in a counter-clockwise direction about its pivot 117 by means of a leaf spring 119, the pawl being adapted to engage the successive teeth of the ratchet nut 121 mounted in the casing on the bushing 123. The bushing 123 is adapted to have threaded engagement with the adjuster screw 125 secured to the crosshead. Fluid admitted through the line 100 to the upper portion of the cylinder causes downward movement of the piston. Downward movement of the piston causes the pawl to engage successive teeth of the ratchet nut, and upward movement of the piston by the spring 111 causes the nut to be advanced whereby the slack is taken up through the screw and the crosshead. The slack adjuster is operable when there is an excessive amount of slack in the brake rigging or as particularly described in Clegg Patent No. 1,559,503, granted October 27, 1925.

The upper end of the rod 94 is connected by a pin and slot connection 106 to the bar or link 108 which acts as a pull rod, said bar being pivotally connected at one end as at 110 to the upper end of the live lever 44 provided at the right end of the truck. The opposite end of the member 108 is connected as at 112 to the radius rod 114 through which a suitable connection is made as at 116 to hand operating mechanism.

In operation of the device, when it is desired to apply the brakes, air is supplied to the cylinder on each side of the truck, causing the piston rod 76 to move toward the right as viewed in Figures 1 and 2. This movement of the piston rod causes the operating lever 80 to move in a clockwise direction around the pivot 82. Movement of the operating lever also moves the fulcrum lever in a clockwise direction around the pivot 96, causing the bar 108 to move toward the right. Movement of the bar toward the right causes the live lever 44, at the right of the wheels in Figures 1 and 2, to apply the adjacent brake shoe, causing pulling operation of the successive pull rods 66 and 60 whereby the brake shoes on opposite sides of the wheel and axle assemblies are applied to the respective wheels.

Hand operation may also be effected by operating the brake staff and causing pulling operation of the connection 116, moving the radius or equalizing lever 114 to the right. Movement of the radius lever causes a pull in the connection 112 and also a pull in the bar 108, thus causing the operation already described to take place, setting the brakes.

Suitable release mechanism may also be provided for releasing the brakes after the hand brake mechanism has been released or the power is exhausted from the cylinder and the piston rod moved toward the left as viewed in the figures.

It is to be understood that I do not wish to be limited by the exact embodiment of the device shown, which is merely by way of illustration and not limitation, as various and other forms of the device will of course be apparent to those skilled in the art without departing from the spirit of the invention or the scope of the claims.

I claim:

1. In a brake mechanism, the combination of a truck lever, a horizontally disposed brake cylinder, a substantially vertical operating lever operatively associated with said cylinder, a fulcrum lever connected to said operating lever, and means connecting said fulcrum lever to said truck lever by means of which the brakes are operated.

2. In a brake mechanism, the combination of a truck frame, a horizontally disposed brake cylinder secured to said frame at one side thereof, an operating lever pivoted intermediate the ends thereof to said truck frame and operatively associated with said cylinder, a fulcrum lever connected to said operating lever and disposed at an angle thereto, a truck lever, and means connecting said fulcrum lever with the truck lever whereby the brakes are operated.

3. In a brake mechanism, the combination of a truck frame, a horizontally disposed brake cylinder secured to said frame, brackets secured to said frame, a substantially vertical operating lever pivoted to one of said brackets, a fulcrum lever pivoted to the other of said brackets, a connection between said operating and fulcrum levers a piston rod working in said cylinder, a truck lever, means connecting said operating lever to the piston rod, and other means connecting said fulcrum lever to said truck lever.

4. In a brake mechanism, the combination of a truck frame, a horizontally disposed brake cylinder secured to said frame, brackets secured to said frame, an operating lever pivoted to one of said brackets and operatively connected to said cylinder, a fulcrum lever pivoted to the other bracket and disposed at an angle to said operating lever, a connection between said operating and fulcrum levers, a truck lever, a slotted bar connected to the truck lever, and means for slidably mounting one end of the fulcrum lever in said slotted bar.

5. In a brake mechanism, the combination of a truck frame and truck lever, a horizontally disposed brake cylinder secured to said frame, a piston rod operated by said cylinder toward one end of said truck, a vertically disposed operating lever connected to said piston rod, a fulcrum lever having connection with said operating lever, a slotted bar, the other end of said fulcrum lever being slidably mounted in said slotted bar for transmitting the braking movements to said truck lever.

6. In a brake mechanism, the combination of a truck frame, a horizontally disposed brake cylinder secured to said frame, brackets secured to said frame, an operating lever pivoted at substantially its mid-portion to one bracket, a fulcrum lever pivoted beyond its mid-portion to the other bracket, means connecting said levers, said pivot point for the fulcrum lever being adjustable, and means connecting the end of said fulcrum lever to brake rigging.

7. In a brake mechanism, the combination of a truck frame, a brake cylinder secured to said frame, brackets secured to said frame, a substantially vertical operating lever pivoted to one of said brackets, a fulcrum lever pivoted to the other of said brackets and disposed at an angle to said operating lever, a piston rod working in said cylinder, a live truck lever, means connecting said operating lever to the piston rod, and other means connecting said fulcrum lever to said truck lever.

8. In a brake mechanism, the combination with a truck frame having depending pedestals, a brake cylinder secured to said frame, brackets secured to said frame, one of said brackets having securement to one of the pedestals, an operating lever pivoted at substantially its mid-portion to said pedestal bracket, a fulcrum lever pivoted to the other of said brackets, a live truck lever, a slotted bar connected to the truck lever, means for slidably mounting one end of the fulcrum lever in said slotted bar, and a link connecting the other end of the fulcrum lever to the lower end of the operating lever.

9. In a brake mechanism, the combination of a truck frame having depending pedestals, a horizontally disposed brake cylinder secured to said frame, an extension formed on one of the pedestals and having a bracket secured thereto, a substantially vertical operating lever pivoted to said bracket, a fulcrum lever pivotally supported from the frame and disposed at an angle to said operating lever, means connecting said levers, and means connecting the other end of said fulcrum lever to brake rigging.

10. In a brake mechanism, the combination of a truck frame, a horizontally disposed brake cylinder secured thereto, an operating lever, a fulcrum lever, said operating lever being operatively connected to said brake cylinder and to said fulcrum lever, said operating lever and said fulcrum lever each being fulcrumed intermediate their ends on said truck frame, and truck brake means connected to said fulcrum lever.

11. In a brake mechanism, the combination of a truck frame, a horizontally disposed brake cylinder secured adjacent and operating in the direction of an end of said truck frame, an operating lever and a fulcrum lever each fulcrumed on said truck frame, said operating lever being operatively connected to said brake cylinder and to said fulcrum lever.

12. In a brake mechanism, the combination of a truck frame and a brake cylinder mounted thereon, a lever fulcrumed on said truck frame below said cylinder and operatively connected to said brake cylinder, a fulcrum lever fulcrumed on said truck frame and operatively connected to said first named lever, and a live truck lever operatively connected adjacent one end thereof to said fulcrum lever.

13. In brake mechanism, the combination of a truck frame, spaced wheel and axle assemblies cooperating therewith, a dead truck lever connected to a brake beam, a live truck lever connected to a brake beam, brake shoes on said beams, pull rod means connecting said live and dead levers, a brake cylinder mounted on said truck frame, a slack adjuster, a fulcrum lever connected to said slack adjuster and to one of said truck levers, and an operating lever pivoted to said truck frame and connected to said fulcrum lever and operated by said brake cylinder.

14. In a car truck, the combination of a live truck lever, a brake cylinder mounted on said truck adjacent an end thereof and operating in the direction of said end, an operating lever operatively associated with said cylinder, a fulcrum lever connected to said operating lever, and means connected to one end of said fulcrum lever and to one end of said truck lever by means of which the brakes are operated.

15. In brake mechanism, the combination of a truck frame, a wheel and axle assembly cooperating therewith, truck levers on opposite sides of said wheel and axle assembly, a connection between said truck levers disposed above the axle, brake shoes disposed on opposite sides of the wheel and connected to said truck levers, a brake cylinder mounted on said truck frame, a slack adjuster, a fulcrum lever connected to said slack adjuster and to one of said truck levers, and an operating lever pivoted to said truck frame and connected to said fulcrum lever and operated by said brake cylinder.

16. In brake mechanism, the combination of a truck frame, spaced wheel and axle assemblies cooperating therewith, a dead truck lever connected to a brake beam, a live truck lever connected to a brake beam, brake shoes on said beams, pull rod means connecting said live and dead levers, a brake cylinder mounted on said truck frame, a fulcrum lever pivotally mounted on said truck frame and connected to one of said truck levers, and an operating lever pivoted to said truck frame and connected to said fulcrum lever and operated by said brake cylinder.

17. In brake mechanism, the combination of a truck frame, spaced wheel and axle assemblies cooperating therewith, a dead truck lever connected to a brake beam, a live truck lever connected to a brake beam, brake shoes on said beams, pull rod means connecting said live and dead levers, a brake cylinder mounted on said truck frame, a slack adjuster, a fulcrum lever connected to said slack adjuster and to said live lever, and an operating lever pivoted to said truck frame and connected to said fulcrum lever and operated by said brake cylinder.

18. In brake mechanism, the combination of a truck frame, a wheel and axle assembly cooperating therewith, truck levers on opposite sides of said wheel and axle assembly, a pull rod connecting said truck levers, brake shoes disposed on opposite sides of the wheel and connected to said truck levers, a brake cylinder mounted on said truck frame, a slack adjuster, a fulcrum lever connected to said slack adjuster and to one of said truck levers, and an operating lever pivoted to said truck frame and connected to said fulcrum lever and operated by said brake cylinder.

19. In brake mechanism, the combination of a truck frame, a wheel and axle assembly cooperating therewith, truck levers on opposite sides of said wheel and axle assembly, a pull rod connecting said truck levers and disposed above the axle, brake shoes disposed on opposite sides of the wheel and connected to said truck levers, a brake cylinder mounted on said truck frame, a slack adjuster, a fulcrum lever connected to said slack adjuster and to one of said truck levers, and an operating lever pivoted to said truck frame and connected to said fulcrum lever and operated by said brake cylinder.

20. In brake mechanism, the combination of a truck frame, spaced wheel and axle assemblies cooperating therewith, a dead truck lever connected to a brake beam, a live truck lever connected to a brake beam, brake shoes on said beams, pull rod means connecting said live and dead levers and disposed above the axles, a brake cylinder mounted on said truck frame, a slack adjuster, a fulcrum lever connected to said slack adjuster and to one of said truck levers, and an operating lever pivoted to said truck frame and connected to said fulcrum lever and operated by said brake cylinder.

21. In brake mechanism, the combination of a truck frame, a wheel and axle assembly cooperating therewith, truck levers on opposite sides of said wheel and axle assembly, a connection between said truck levers, brake shoes disposed on opposite sides of the wheel and connected to said truck levers, a brake cylinder mounted on said truck frame, a fulcrum lever pivotally mounted on said truck frame and connected to one of said truck levers, and an operating lever pivoted to said truck frame below said cylinder and connected to said fulcrum lever and operated by said brake cylinder.

22. In brake mechanism, the combination of a truck frame, a wheel and axle assembly cooperating therewith, truck levers on opposite sides of said wheel and axle assembly, a connection between said truck levers above the axle, brake shoes disposed on opposite sides of the wheel and connected to said truck levers, a brake cylinder mounted on said truck frame, a fulcrum lever pivotally mounted on said truck frame and connected to one of said truck levers, and an operating lever pivoted to said truck frame below said cylinder and connected to said fulcrum lever and operated by said brake cylinder.

23. In brake mechanism, the combination of a truck frame, a wheel and axle assembly cooperating therewith, truck levers on opposite sides of said wheel and axle assembly, a connection between said truck levers disposed above the axle, brake shoes disposed on opposite sides of the wheel and connected to said truck levers, a brake cylinder mounted adjacent an end of said truck frame and operating in the direction of said end, a fulcrum lever pivoted to said truck frame and connected to one of said truck levers, and intermediate connections between the fulcrum lever and said brake cylinder, said connections including a lever connected to the piston of said cylinder and to said fulcrum lever.

24. In brake mechanism, the combination of a truck frame, a wheel and axle assembly cooperating therewith, truck levers on opposite sides of said wheel and axle assembly, a pull rod connection between said truck levers, brake shoes disposed on opposite sides of the wheel and connected to said truck levers, a brake cylinder mounted adjacent an end of said truck frame and operating in the direction of said end, a fulcrum lever pivoted to said truck frame and connected to one of said truck levers, and intermediate connections between the fulcrum lever and said brake cylinder, said connections including a lever pivoted to said frame and connected to the piston of said cylinder and to said fulcrum lever.

25. In brake mechanism, the combination of a truck frame, a wheel and axle assembly cooperating therewith, truck levers on opposite sides of said wheel and axle assembly, a pull rod connection between said truck levers disposed above the axle, brake shoes disposed on opposite sides of the wheel and connected to said truck levers, a brake cylinder mounted on said truck frame, a fulcrum lever pivoted to said truck frame and connected to one of said truck levers, and connections between said lever and said brake cylinder, said connections including a lever pivoted to said frame below said cylinder and connected to the piston of said cylinder and to said fulcrum lever.

26. In brake mechanism, the combination of a truck frame, a wheel and axle assembly cooperating therewith, truck levers on opposite sides of said wheel and axle assembly, a connection between said truck levers disposed above the axle, brake shoes disposed on opposite sides of the wheel and connected to said truck levers, a brake cylinder mounted on said truck frame, a slack adjuster carried by said truck, a lever associated with said slack adjuster for compensating movement thereby, said lever being connected to one of said truck levers, and connections between said lever and said brake cylinder, said connections including a lever pivoted to said frame and connected to the piston of said cylinder and to said last named lever.

27. In brake mechanism, the combination of a truck frame, a wheel and axle assembly cooperating therewith, truck levers on opposite sides of said wheel and axle assembly, a pull rod connection between said truck levers, brake shoes disposed on opposite sides of the wheel and connected to said truck levers, a brake cylinder mounted on said truck frame, a slack adjuster carried by said truck, a lever associated with said slack adjuster for compensating movement thereby, said lever being connected to one of said truck levers, and intermediate connections including a substantially vertical operating lever connecting said compensating lever and said brake cylinder.

28. In brake mechanism, the combination of a truck frame, a wheel and axle assembly cooperating therewith, truck levers on opposite sides of said wheel and axle assembly, a pull rod connection between said truck levers disposed above the axle, brake shoes disposed on opposite sides of the wheel and connected to said truck levers, a brake cylinder mounted on said truck frame, a slack adjuster carried by said truck, a fulcrum lever associated with said slack adjuster for compensating movement thereby, said fulcrum lever being connected to one of said truck levers, and intermediate connections including a substantially vertical operating lever mounted on the truck frame between said fulcrum lever and said brake cylinder and operatively connected to said cylinder and fulcrum lever.

29. In brake mechanism, the combination of a truck frame, spaced wheel and axle assemblies cooperating therewith, a dead truck lever connected to a brake beam, a live truck lever connected to a brake beam, brake shoes on said beams, pull rod means connecting said live and dead levers, an equalizing lever connected to one of said live levers, manually operable means for operating said equalizing lever for actuating said brake mechanism, a brake cylinder mounted on said truck frame, a slack adjuster, a fulcrum lever connected to said slack adjuster and loosely connected to one of said truck levers, and an operating lever pivoted to said truck frame and connected to said fulcrum lever and operated by said brake cylinder.

30. In brake mechanism, the combination of a truck frame, spaced wheel and axle assemblies cooperating therewith, a dead truck lever connected to a brake beam, a live truck lever connected to a brake beam, brake shoes on said beams, pull rod means connecting said live and dead levers, an equalizing lever connected to one of said live levers, manually operable means for operating said equalizing lever for actuating said brake mechanism, a brake cylinder mounted on said truck frame, a slack adjuster, a fulcrum lever connected to said slack adjuster and to one of said truck levers, and an operating lever pivoted to said truck frame and connected to said fulcrum lever and operated by said brake cylinder.

31. In brake mechanism, the combination of a truck frame, spaced wheel and axle assemblies cooperating therewith, a dead truck lever connected to a brake beam, a live truck lever connected to a brake beam, brake shoes on said beams, pull rod means connecting said live and dead levers, an equalizing lever connected to one of said live levers, manually operable means for operating said equalizing lever for actuating said brake mechanism, a brake cylinder mounted on said truck frame, and operating in the direction of the adjacent end of said frame, and a lever connected to one of said live levers and operated by said brake cylinder.

32. In brake mechanism, the combination of a truck frame, spaced wheel and axle assemblies cooperating therewith, a dead truck lever connected to a brake beam, a live truck lever connected to a brake beam, brake shoes on said beams, pull rod means connecting said live and dead levers, an equalizing lever connected to one of said live levers, manually operable means for operating said equalizing lever for actuating said brake mechanism, a brake cylinder mounted on said truck frame and operating in the direction of the adjacent end of said frame, and a lever loosely connected to said last named live lever and operated by said brake cylinder, whereby operation may be accomplished independently by said manually operable means or said brake cylinder.

33. In a brake arrangement, the combination of a truck frame, a wheel associated therewith, brake rigging associated with said wheel for braking cooperation therewith, a fulcrum lever pivoted at one end to said brake rigging and pivoted intermediate the ends thereof to said truck frame, an operating lever pivoted intermediate the ends thereof to said truck frame and connected at one end to the other end of said fulcrum lever, a horizontally disposed brake cylinder mounted on said truck frame and operating in the direction of an end thereof, the piston of said brake cylinder being connected to the other end of said operating lever.

34. In a brake arrangement, the combination of a truck frame, a brake cylinder mounted on said truck frame adjacent and operating in the direction of one end thereof, an operating lever pivoted intermediate the ends thereof to said truck frame and connected at one end to said piston, the other end of said operating lever being connected to brake rigging.

35. In a brake arrangement, the combination of a truck frame, a wheel associated therewith, brake rigging associated with said wheel for braking cooperation therewith, a horizontally disposed brake cylinder mounted adjacent and operating in the direction of one end of said truck frame, an operating lever pivoted intermediate the ends thereof to said truck frame and connected at one end thereof to the piston of said cylinder, and means connecting the other end of the operating lever to said brake rigging.

36. In a brake arrangement, the combination of a truck frame, a wheel associated therewith, brake rigging associated with said wheel for braking cooperation therewith, a horizontally disposed brake cylinder mounted adjacent and operating in the direction of one end of said truck frame, an operating lever pivoted intermediate the ends thereof to said truck frame and connected at one end thereof to the piston of said cylinder, and means connecting the other end of the operating lever to said brake rigging, said means including a fulcrum lever pivoted intermediate the ends thereof to said truck frame and connected adjacent one end thereof to the end of said operating lever, the other end of said fulcrum lever being connected to said brake rigging.

37. In a brake arrangement, the combination of a truck frame, a wheel associated therewith, brake rigging associated with said wheel for braking cooperation therewith, a brake cylinder mounted on said truck frame adjacent and operating in the direction of one end thereof, an operating lever pivoted at one end to the piston of said cylinder and pivoted intermediate the ends thereof to said truck frame, and means connecting the other end of said operating lever to said brake rigging, said means including a fulcrum lever pivotally connected at one end thereof to said operating lever and pivotally mounted on said truck frame.

38. In a brake arrangement, the combination of a truck frame, a wheel associated therewith, brake rigging associated with said wheel for braking cooperation therewith, a horizontally disposed brake cylinder mounted on said truck frame adjacent and operating in the direction of one end thereof, an operating lever pivotally mounted on said truck frame and connected to the piston of said cylinder, and means connecting said operating lever to said brake rigging, said means including a fulcrum lever pivoted intermediate the ends thereof to said truck frame and connected at the ends thereof to said operating lever and said brake rigging.

39. In a brake arrangement, the combination of a truck frame including a side frame and an end connecting member, a wheel associated therewith inwardly of the side frame, brake rigging associated with said wheel for braking cooperation therewith, a brake cylinder mounted on said side frame outwardly thereof and disposed adjacent and operating in the direction of said end connecting member, an operating lever pivoted at one end to the piston of said cylinder and pivoted intermediate the ends thereof to said truck frame, and means connecting the other end of said operating lever to said brake rigging, said means including a fulcrum lever pivotally connected at one end thereof to said operating lever and pivotally mounted on said end connecting member.

40. In a brake arrangement, the combination of a truck frame including a side frame and an end connecting member, a wheel associated therewith inwardly of the side frame, brake rigging associated with said wheel for braking cooperation therewith, a brake cylinder mounted on said side frame outwardly thereof and disposed adjacent and operating in the direction of said end connecting member, an operating lever pivoted at one end to the piston of said cylinder and pivoted intermediate the ends thereof to said truck frame, and means connecting the other end of said operating lever to said brake rigging, said means including a fulcrum lever pivotally connected at one end thereof to said operating lever and pivotally mounted intermediate the ends thereof to said end connecting member.

41. In a brake arrangement, the combination of a truck frame including a side frame and an end connecting member, a wheel associated therewith inwardly of the side frame, brake rigging associated with said wheel for braking cooperation therewith, a brake cylinder mounted on said side frame outwardly thereof and disposed adjacent and operating in the direction of said end connecting member, a substantially vertically arranged operating lever pivoted at one end thereof to the piston of said cylinder and pivoted intermediate the ends thereof to said truck frame, and means connecting the other end of said operating lever to said brake rigging, said means including a substantially diagonally disposed fulcrum lever pivotally connected at its lower end to said operating lever and pivotally mounted intermediate the ends thereof on said end connecting member.

42. In a brake arrangement, the combination of a truck frame, a wheel associated therewith, brake rigging associated with said wheel for braking cooperation therewith, said brake rigging including live truck levers disposed on each side of said wheel and a connection therebetween disposed above the wheel center, a fulcrum lever pivoted at one end to said brake rigging and pivoted intermediate the ends thereof to said truck frame, an operating lever pivoted intermediate the ends thereof to said truck frame and connected at one end to the other end of said fulcrum lever, a horizontally disposed brake cylinder mounted on said truck frame and operating in the direction of an end thereof, the piston of said brake cylinder being connected to the other end of said operating lever.

43. In a brake arrangement, the combination of a truck frame, a wheel associated therewith, brake rigging associated with said wheel for braking cooperation therewith, said brake rigging including live truck levers disposed on each side of said wheel and a connection therebetween, a fulcrum lever pivoted at one end to said brake rigging and pivoted intermediate the ends thereof to said truck frame, an operating lever pivoted intermediate the ends thereof to said truck frame and connected at one end to the other end of said fulcrum lever, a horizontally disposed brake cylinder mounted on said truck frame and operating in the direction of an end thereof, the piston of said brake cylinder being connected to the other end of said operating lever.

44. In a brake arrangement, the combination of a truck frame, a wheel associated therewith, brake rigging associated with said wheel for braking cooperation therewith, said brake rigging including live truck levers disposed on each side of said wheel and a connection therebetween disposed above the wheel center, a horizontally disposed brake cylinder mounted adjacent and operating in the direction of one end of said truck frame, an operating lever pivoted intermediate the ends thereof to said truck frame and connected at one end thereof to the piston of said cylinder, and means connecting the other end of the operating lever to said brake rigging.

45. In a brake arrangement, the combination of a truck frame, a wheel associated therewith, brake rigging associated with said wheel for braking cooperation therewith, said brake rigging including live truck levers disposed on each side of said wheel and a connection therebetween, a horizontally disposed brake cylinder mounted adjacent and operating in the direction of one end of said truck frame, an operating lever pivoted intermediate the ends thereof to said truck frame and connected at one end thereof to the piston of said cylinder, and means connecting the other end of the operating lever to said brake rigging.

46. In a brake arrangement, the combination of a truck frame, a wheel associated therewith, brake rigging associated with said wheel for braking cooperation therewith, said brake rigging including live truck levers disposed on each side of said wheel and a connection therebetween disposed above the wheel center, a horizontally disposed brake cylinder mounted adjacent and operating in the direction of one end of said truck frame, an operating lever pivoted intermediate the ends thereof to said truck frame and connected at one end thereof to the piston of said cylinder, and means connecting the other end of the operating lever to said brake rigging, said means including a fulcrum lever pivoted intermediate the ends thereof to said truck frame and connected adjacent one end thereof to the end of said operating lever, the other end of said fulcrum lever being connected to said brake rigging.

47. In a brake arrangement, the combination of a truck frame, a wheel associated therewith, brake rigging associated with said wheel for braking cooperation therewith, said brake rigging including live truck levers disposed on each side of said wheel and a connection therebetween, a horizontally disposed brake cylinder mounted adjacent and operating in the direction of one end of said truck frame, an operating lever pivoted intermediate the ends thereof to said truck frame and connected at one end thereof to the piston of said cylinder, and means connecting the other end of the operating lever to said brake rigging, said means including a fulcrum lever pivoted intermediate the ends thereof to said truck frame and connected adjacent one end thereof to the end of said operating lever, the other end of said fulcrum lever being connected to said brake rigging.

48. In a brake arrangement, the combination of a truck frame, a wheel associated therewith, brake rigging associated with said wheel for braking cooperation therewith, said brake rigging including live truck levers disposed on each side of said wheel and a connection therebetween disposed above the wheel center, a brake cylinder mounted on said truck frame adjacent and operating in the direction of one end thereof, an operating lever pivoted at one end to the piston of said cylinder and pivoted intermediate the ends thereof to said truck frame, and means connecting the other end of said operating lever to said brake rigging, said means including a fulcrum lever pivotally connected at one end thereof to said operating lever and pivotally mounted on said truck frame.

49. In a brake arrangement, the combination of a truck frame, a wheel associated therewith, brake rigging associated with said wheel for braking cooperation therewith, said brake rigging including live truck levers disposed on each side of said wheel and a connection therebetween, a brake cylinder mounted on said truck frame adjacent and operating in the direction of one end thereof, an operating lever pivoted at one end to the piston of said cylinder and pivoted intermediate the ends thereof to said truck frame, and means connecting the other end of said operating lever to said brake rigging, said means including a fulcrum lever pivotally connected at one end thereof to said operating lever and pivotally mounted on said truck frame.

50. In a brake arrangement, the combination of a truck frame, a wheel associated therewith, brake rigging associated with said wheel for braking cooperation therewith, said brake rigging including live truck levers disposed on each side of said wheel and a connection therebetween disposed above the wheel center, a horizontally disposed brake cylinder mounted on said truck frame adjacent and operating in the direction of one end thereof, an operating lever pivotally mounted on said truck frame and connected to the piston of said cylinder, and means connecting said operating lever to said brake rigging, said means including a fulcrum lever pivoted intermediate the ends thereof to said truck frame and connected at the ends thereof to said operating lever and said brake rigging.

51. In a brake arrangement, the combination of a truck frame, a wheel associated therewith, brake rigging associated with said wheel for braking cooperation therewith, said brake rigging including live truck levers disposed on each side of said wheel and a connection therebetween, a horizontally disposed brake cylinder mounted on said truck frame adjacent and operating in the direction of one end thereof, an operating lever pivotally mounted on said truck frame and connected to the piston of said cylinder, and means connecting said operating lever to said brake rigging, said means including a fulcrum lever pivoted intermediate the ends thereof to said truck frame and connected at the ends thereof to said operating lever and said brake rigging.

52. In a brake arrangement, the combination of a truck frame including a side frame and an end connecting member, a wheel associated therewith inwardly of the side frame, brake rigging associated with said wheel for braking cooperation therewith, said brake rigging including live truck levers disposed on each side of said wheel and a connection therebetween disposed above the wheel center, a brake cylinder mounted on said side frame outwardly thereof and disposed adjacent and operating in the direction of said end connecting member, an operating lever pivoted at one end to the piston of said cylinder and pivoted intermediate the ends thereof to said truck frame, and means connecting the other end of said operating lever to said brake rigging, said means including a fulcrum lever pivotally connected at one end thereof to said operating lever and pivotally mounted on said end connecting member.

53. In a brake arrangement, the combination of a truck frame including a side frame and an end connecting member, a wheel associated therewith inwardly of the side frame, brake rigging associated with said wheel for braking cooperation therewith, said brake rigging including live truck levers disposed on each side of said wheel and a connection therebetween, a brake cylinder mounted on said side frame outwardly thereof and disposed adjacent and operating in the direction of said end connecting member, an operating lever pivoted at one end to the piston of said cylinder and pivoted intermediate the ends thereof to said truck frame, and means connecting the other end of said operating lever to said brake rigging, said means including a fulcrum lever pivotally connected at one end thereof to said operating lever and pivotally mounted on said end connecting member.

54. In a truck brake equipment, the combination with a truck frame having side members, of a system of operatively connected truck levers carried by said truck frame, said system comprising a dead lever and a live lever and also comprising means for operating said live lever, of a fulcrum lever operatively connected to said dead lever, a slack adjuster carried by said truck frame, another fulcrum lever pivotally connected with respect to the truck frame and slack adjuster, and means operatively connecting said fulcrum levers.

55. In a brake mechanism, the combination of a truck lever, a brake cylinder having a movable piston therein, a pivoted operating lever having an end operated by said piston, a pivoted fulcrum lever having an end connected to said operating lever and an end connected to one end of said truck lever, said pivot for the fulcrum lever being adjustable.

56. In a brake mechanism, the combination of a truck lever, a horizontally disposed brake cylinder having a movable piston therein, a pivoted operating lever having an end operated by said piston, a pivoted fulcrum lever having an end connected to said operating lever and an end connected to said truck lever, said pivot for the fulcrum lever being adjustable.

57. In a brake mechanism, the combination of a truck lever, a brake cylinder having a movable piston therein, a pivoted substantially vertical operating lever having an end operated by said piston, a pivoted fulcrum lever having an end connected to said operating lever and an end connected to said truck lever, said pivot for the fulcrum lever being adjustable.

58. In a brake mechanism, the combination of a truck lever, a horizontally disposed brake cylinder having a movable piston therein, a pivoted substantially vertical operating lever having an end operated by said piston, a pivoted fulcrum lever having an end connected to said operating lever and an end connected to said truck lever, said pivot for the fulcrum lever being adjustable.

59. In a brake mechanism, the combination of a truck lever, a brake cylinder, a pivoted operating lever operable with said cylinder, a pivoted fulcrum lever having an end connected to said operating lever and an end connected to said truck lever, and a slack adjuster for adjusting the pivot of said fulcrum lever.

60. In a brake mechanism, the combination of a truck frame and a brake cylinder mounted thereon, a lever fulcrumed on said truck frame below said cylinder and operatively connected to said brake cylinder, a fulcrum lever fulcrumed on said truck frame and operatively connected to said first named lever, and a truck lever operatively connected adjacent one end thereof to said fulcrum lever, the other end thereof being connected to a brake shoe.

61. In a brake mechanism, the combination of a truck frame and a brake cylinder mounted thereon, a lever fulcrumed on said truck frame below said cylinder and operatively connected to said brake cylinder, a fulcrum lever fulcrumed on said truck frame and operatively connected to said first named lever, and a vertically disposed live truck lever operatively connected to said fulcrum lever.

62. In a brake mechanism, the combination of a vertically disposed live truck lever, a brake cylinder having a movable piston therein, a pivoted operating lever having an end operated by said piston, a pivoted fulcrum lever having an end connected to said operating lever and an end connected to one end of said truck lever, said pivot for the fulcrum lever being adjustable.

63. In a car truck, the combination of a live truck lever, a brake cylinder mounted on said truck, an operating lever operatively associated with said cylinder, a fulcrum lever connected to an end of said operating lever, and means connecting said fulcrum lever to one end of said truck lever by means of which the brakes are operated.

ORMAH R. MITCHELL.